United States Patent
Zhu et al.

(10) Patent No.: US 11,567,661 B2
(45) Date of Patent: Jan. 31, 2023

(54) VIRTUAL MEMORY MANAGEMENT METHOD AND PROCESSOR

(71) Applicant: Xiamen SigmaStar Technology Ltd., Fujian (CN)

(72) Inventors: Wei Zhu, Fujian (CN); Chao Li, Fujian (CN); Bo Lin, Fujian (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 12 days.

(21) Appl. No.: 17/231,133

(22) Filed: Apr. 15, 2021

(65) Prior Publication Data

US 2022/0075522 A1 Mar. 10, 2022

(30) Foreign Application Priority Data

Sep. 4, 2020 (CN) .......................... 202010923514.X (51) Int. Cl.
*G06F 3/00* (2006.01)
*G06F 3/06* (2006.01)

(52) U.S. Cl.
CPC .......... *G06F 3/0604* (2013.01); *G06F 3/0629* (2013.01); *G06F 3/0673* (2013.01)

(58) Field of Classification Search
None
See application file for complete search history.

(56) References Cited

U.S. PATENT DOCUMENTS

| 11,288,188 B1 * | 3/2022 | Tummala | G06F 12/0215 |
| 2015/0363329 A1 * | 12/2015 | Precourt | G06F 12/0292 711/207 |

* cited by examiner

*Primary Examiner* — Midys Rojas
(74) *Attorney, Agent, or Firm* — Edell, Shapiro & Finnan, LLC (57) ABSTRACT

A virtual memory management method applied to an intelligent processor including an operation accelerator includes: determining m storage units from a physical memory, the m storage units forming a virtual memory; dividing the m storage units into n storage groups; determining an address mapping relationship for each storage group to obtain n address mapping relationships, the n address mapping relationship being correspondence of between n virtual addresses of the virtual memory and physical addresses of the m storage units, where m and n are dynamically updated according to requirements of the operation accelerator. In the method, the number of the storage units in each storage group can be configured according to requirements of the operation accelerator, and a data storage bit width and a data storage depth of the virtual memory are dynamically updated to thereby improve data access efficiency.

12 Claims, 8 Drawing Sheets

VIRTUAL MEMORY MANAGEMENT METHOD AND PROCESSOR

This application claims the benefit of China application Serial No. CN202010923514.X, filed on Sep. 4, 2020, the subject matter of which is incorporated herein by reference.

BACKGROUND OF THE INVENTION

Field of the Invention

The invention relates to the technical field of electronics, and more particularly to a virtual memory management method and a processor.

Description of the Related Art

Current electronic apparatuses such as smartphones and personal computers all include memories, e.g., random access memories (RAMs), for storing data. When an electronic apparatus accesses data stored in a memory, the memory is accessed via a fixed access interface, and the width and depth of a storage space that can be accessed each time are invariable, resulting in restricted data access efficiency.

SUMMARY OF THE INVENTION

The present application provides a virtual memory management method and a processor capable of improving data storage and access efficiency.

The present application provides a virtual memory management method applied to an intelligent processor including an operation accelerator. The virtual memory management method of the present application includes: determining m storage units from a physical memory, the m storage units forming a virtual memory, each of the storage units being a minimum storage unit of the physical memory; dividing the m storage units into n storage groups; and determining an address mapping relationship for each of the storage groups to obtain n address mapping relationships, the n address mapping relationships being correspondence between n virtual addresses of the virtual memory and physical addresses of the m storage units, wherein m and n are positive integers, m is greater than or equal to n, and m and n are dynamically updated according to requirements of the operation accelerator.

The present application further provides a processor for executing a program code to implement a virtual memory management method, the virtual memory management method being applied to an intelligent processor including an operation accelerator. The virtual memory management method includes: determining m storage units from a physical memory, the m storage units forming a virtual memory, each of the storages units being a minimum storage unit of the physical memory; dividing the m storage units into n storage groups; and determining an address mapping relationship for each of the storage groups to obtain n address mapping relationships, the n address mapping relationships being correspondence between n virtual addresses of the virtual memory and physical addresses of the m storage units, where m and n are positive integers, m is greater than or equal to n, and m and n are dynamically updated according to requirements of the operation accelerator.

The present application provides a virtual memory management method applied to an intelligent processor including a first operation accelerator and a second operation accelerator. The virtual memory management method includes: determining m storage units from a physical memory, the m storage units forming a first virtual memory, each of the storage units being a minimum storage unit of the physical memory; dividing the m storage units into n storage groups; determining a first address mapping table corresponding to the first virtual memory, the first address mapping table including correspondence between n virtual memory addresses of the first virtual memory and physical addresses of the m storage units; determining i storage units from the physical memory, the i storage units forming a second virtual memory; dividing the i storage units into j storage groups; and determining a second address mapping table corresponding to the second virtual memory, the second address mapping table including correspondence between j virtual addresses of the second virtual memory and physical addresses of the i storage units. The first virtual memory is for storing data of the first operation accelerator, and the second virtual memory is for storing data of the second operation accelerator; m, n, i and j are positive integers, m is greater than or equal to n, i is greater than or equal to j, and m is not equal to i.

In the virtual memory management method provided by the present application, the number of storage units in each storage group can be configured according to requirements of an operation accelerator by means of dividing the m storage units into n storage groups, and the data storage bit width and data storage depth of the virtual memory are dynamically updated to thereby improve data storage and access efficiency.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

The technical solutions of the embodiments of the present application are to be clearly and completely described with the accompanying drawings in the embodiments of the present application below. It should be noted that, the described embodiments are only some but not all embodiments of the present application. Other embodiments arrived the basis of the embodiments of the present application without any inventive skills by a person skilled in the art are encompassed within the scope of protection of the present application.

Figure 1:
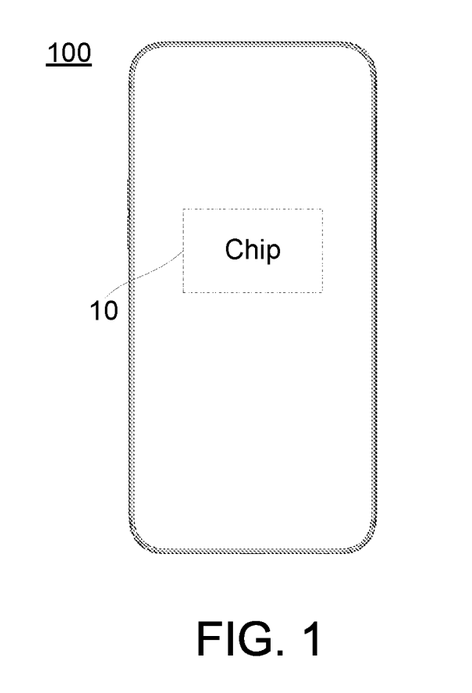
FIG. 1 is a structural schematic diagram of an electronic apparatus provided according to an embodiment of the present application.

Referring to FIG. 1, FIG. 1 shows a structural schematic diagram of an electronic apparatus 100 provided according to an embodiment of the present application.

An electronic apparatus, for example, an electronic apparatus 100, is provided according to an embodiment of the present application. The electronic apparatus 100 may be an apparatus such as a smartphone, a tablet computer, a game device, an augmented reality (AR) apparatus, a data storage device, a video playback device or a video playback device.

The electronic apparatus 100 includes a chip 10. The chip 10 may serve as a main system-on-chip (SoC) of the electronic apparatus 100, and is capable of performing data operation to thereby perform overall monitoring of the electronic apparatus 100 and implement various functions of the electronic apparatus 100.

Figure 2:
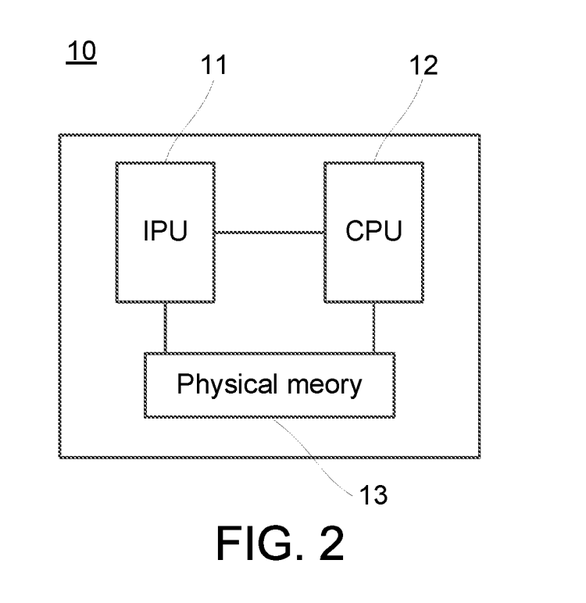
FIG. 2 is a first structural schematic diagram of a chip of the electronic apparatus in FIG. 1.

Referring to FIG. 2, FIG. 2 shows a first structural schematic diagram of the chip 10 of the electronic apparatus in FIG. 1. The chip 10 includes an intelligent processing unit (IPU) 11, a central processing unit (CPU) 12 and a physical memory 13. The IPU 11 is electrically connected to the CPU 12 and the physical memory 13. The CPU 12 is further electrically connected to the physical memory 13. The IPU 11 performs data processing, for example, performing image data processing, video data processing and audio data processing. The CPU 12 may further operate the operating system of the electronic apparatus 100, and perform data operation to thereby realize overall monitoring of the electronic apparatus 100. The physical memory 13 may store data, for example, storing image data and audio data, and may further store data generated during the operation processes of the IPU 11 and the CPU 12.

The physical memory 13 may include various types of memories, for example, static random access memory (SRAM) and dynamic random access memory (DRAM).

Figure 3:
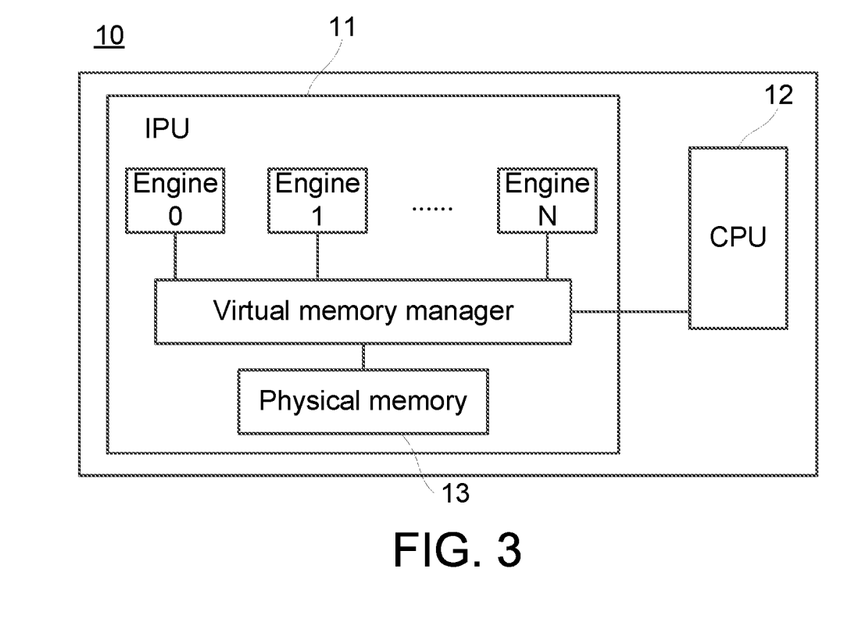
FIG. 3 is a second structural schematic diagram of a chip of the electronic apparatus in FIG. 1.

Referring to FIG. 3, FIG. 3 shows a second structural schematic diagram of the chip 10 of the electronic device in FIG. 1. In FIG. 3, the IPU 11 is built in with a virtual memory manager and multiple engines, for example, engine 0, engine 1, . . . and engine N, wherein the engines may be operation accelerators. Moreover, the IPU 11 may be further built-in with the physical memory 13. The virtual memory manager creates a virtual memory according to the physical memory 13, and manages the virtual memory. The engines may access the physical memory 13 via the virtual memory.

Figure 4:
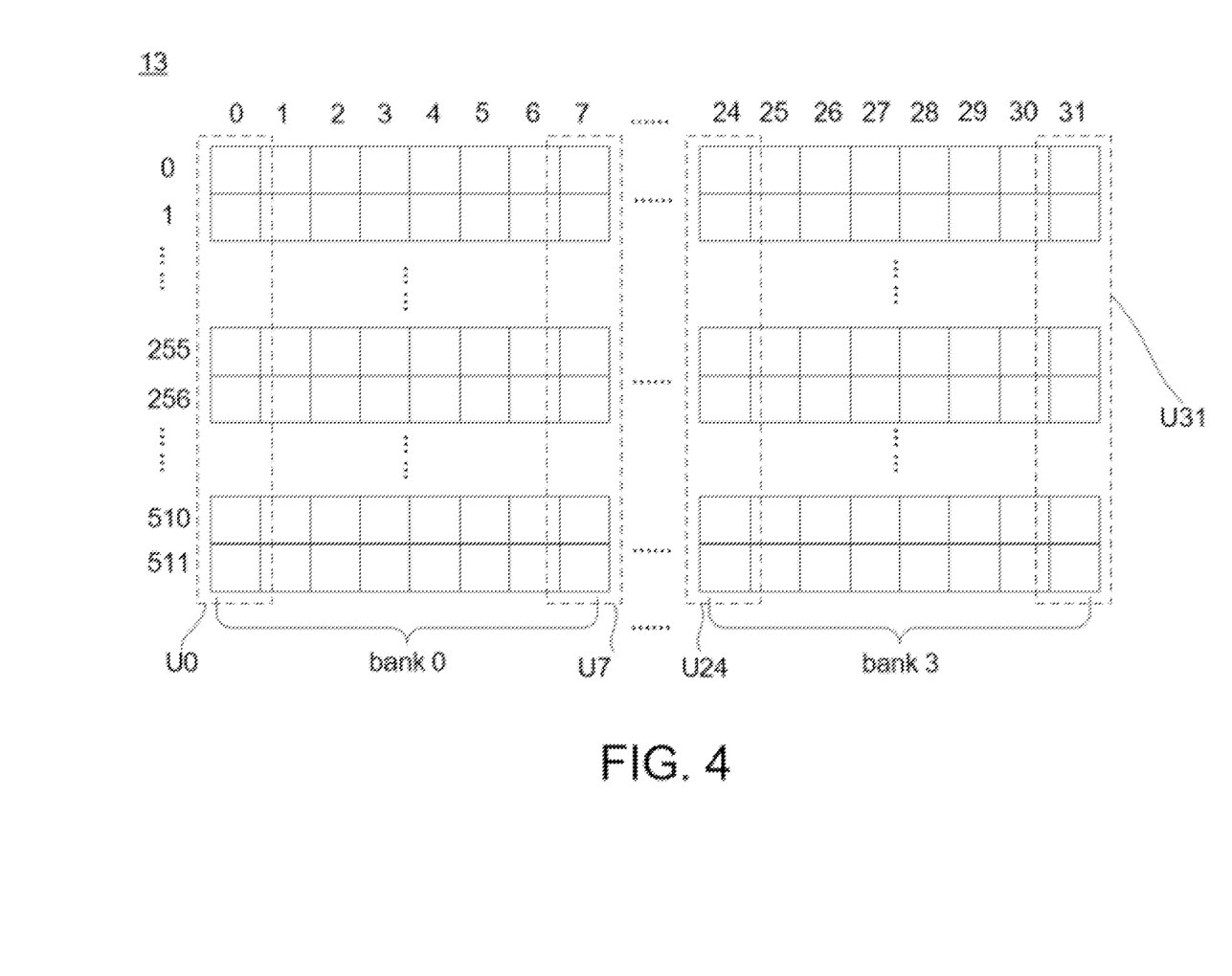
FIG. 4 is a structural schematic diagram of a physical memory of a chip according to an embodiment of the present application.

Referring to FIG. 4, FIG. 4 shows a structural schematic diagram of the physical memory 13 of the chip 10 provided according to an embodiment of the present application. The physical memory 13 includes multiple banks, e.g., bank 0 to bank 3, each of which including multiple storage units, or referred to as Us, e.g., U0 to U31; for example, bank 0 may include U0 to U7, and bank 3 may include U24 to U31. In practice, the storage unit U is a minimum storage unit of the physical memory 13, and each storage unit has a width of 128 bits and a depth of 512 bits.

A virtual memory management method applicable to the IPU 11 is further provided according to an embodiment of the present application. In practice, the virtual memory management method may be implemented by a program code executed by a processor in the electronic apparatus 100, for example, the CPU 12 of the chip 10 may execute a program code to implement the virtual memory management method to thereby create a virtual memory according to the physical memory 13. The virtual memory may store data (the data is actually stored in the Us of the corresponding physical memory 13), and provide the data for access of the electronic apparatus, for example, for access of the engines in the IPU 11.

Figure 5:
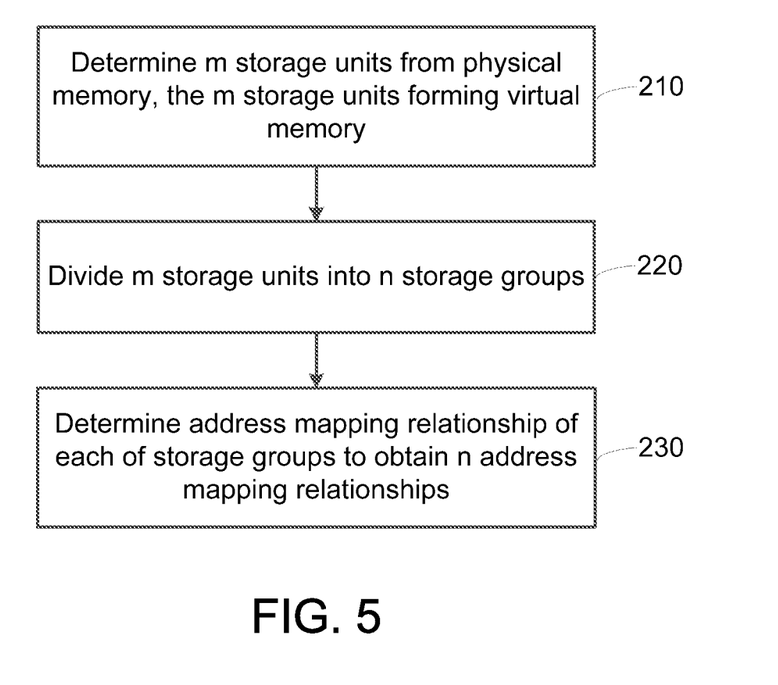
FIG. 5 is a first flowchart of a virtual memory management method according to an embodiment of the present application.

Referring to FIG. 5, FIG. 5 shows a first flowchart of a virtual memory management method provided according to an embodiment of the present application. In this embodiment, a program code is executed by the CPU 12 to implement the virtual memory management method, with steps of the virtual memory management method to be described in detail below.

In step 210, m storage units are determined from a physical memory, wherein the m storage units form a virtual memory, and each storage unit is a minimum storage unit of the physical memory. First of all, the CPU 12 may determine m storage units from the physical memory 13, for example, the determined m storage units may include U0 to U3, where m is a positive integer, e.g., 2, 4 or 8. The m storage units form a virtual memory, and each storage unit may be a minimum storage unit of the physical memory 13.

In practice, the m storage units may be consecutive storage units in the physical memory 13, for example, U0, U1, U2 and U3. The m storage units may also be non-consecutive storage units in the physical memory 13, for example, U0, U2, U5 and U7.

In step 220, the m storage units are divided into n storage groups. After determining the m storage units from the physical memory 13, the CPU 13 divides the m storage units into n storage groups, where n is a positive integer, and m is greater than or equal to n. Thus, among the n storage groups after dividing, each storage group includes at least one storage unit. For example, assuming the m storage units include U0, U1, U2 and U3, U0 and U1 are grouped as group 0, and U2 and U3 are grouped as group 1.

It is understandable that, when one storage group includes multiple storage units, the multiple storage units are arranged side by side to hence increase the bandwidth for storing data in the virtual memory. The expression "arranged side by side" may be interpreted as adding up the bandwidths of the multiple storage units arranged side by side. For example, assuming the bandwidths of U0, U1, U2 and U3 included in group 0 are all 128 bits, the bandwidth of the storage group obtained by arranging U0 and U1 side by side is 256 bits, thereby increasing the bandwidth.

In step 230, an address mapping relationship of each storage group is determined to obtain n address mapping relationships, wherein the n address mapping relationships are correspondence between n virtual addresses of the virtual memory and physical addresses of the m storage units. In practice, one virtual address of the virtual memory is for accessing one storage group in the virtual memory, and thus the physical address (i.e., the actual address) of the corresponding storage unit in the physical memory 13 is obtained according to the address mapping relationship corresponding to the virtual address.

More specifically, after n storage groups are obtained by the dividing performed by the CPU 12, the address mapping relationship between the virtual address of each storage group and the storage unit corresponding to the storage group can be determined to obtain n address mapping relationships. Using the n address mapping relationships, access to the virtual memory can be converted to access to the corresponding storage unit in the physical memory 13.

Further, in order to enhance access efficiency of the physical memory 13, the CPU 12 may dynamically update the values of m and n according to different access requirements, that is, determining the number of selected storage units and the number for dividing into the storage groups. For example, assuming that the CPU 12 plans a virtual memory VB0 for temporarily storing data of the operation of engine 0 in the IPU 11, the CPU 12 can determine according to current operation requirements of engine 0 an appropriate size of the virtual memory for the use of engine 0; for example, m is 4 and n is 2. When there is a change in the operation requirements of engine 0, the CPU 12 may dynamically change the size of virtual memory VB0, for example, changing m to 6 and n to 3. In practice, the CPU 12 may iterate steps 210 to 230 to change the size of virtual memory VB0.

Further, referring to FIG. 3, when there are multiple engines in the IPU 11, that is, the IPU 11 includes a plurality of operation accelerators, for example, including a first operation accelerator and a second operation accelerator, the CPU 12 may create a corresponding virtual memory with respect to requirements of each of the engines. For example, with respect to requirements of engine 0 (e.g., the first operation accelerator), the CPU 12 creates virtual memory VB0 for the use of engine 0, wherein VB0 is for storing data of engine 0; with respect to requirements of engine 1 (e.g., the second operation accelerator), the CPU 12 also creates virtual memory VB1 for the use of engine 1, wherein VB1 is for storing data of engine 1. The size of virtual memory VB0 can be different from the size of virtual memory VB1. As described above, the CPU 12 may divide the m storage units into n storage groups so as to form virtual memory VB0. Similarly, the CPU 12 may perform steps 210 to 230 to divide i storage units into j storage groups so as to form virtual memory VB1, where i and j are positive integers, and i is greater than or equal to j. The size of virtual memory VB0 may be different from the size of virtual memory VB1, that is, m may be not equal to i or n may be not equal to j. Further, as described above, the CPU 12 may determine a first address mapping table corresponding to VB0, wherein the first address mapping table includes correspondence between n virtual addresses of VB0 and physical addresses of the m storage units; the CPU 12 may also determine a second address mapping table corresponding to VB1, wherein the second address mapping table includes correspondence between the j virtual addresses of VB1 and physical addresses of the i storage units.

It is understandable that, the address mapping relationship may include a logical address of each storage unit in the storage group. In some embodiments, each storage unit in the physical memory 13 may have a unique storage unit serial number, or may have a unique storage unit serial number in one determined bank. At this point, the address mapping relationship may also include the serial number of each storage unit in the storage group.

Figure 6:
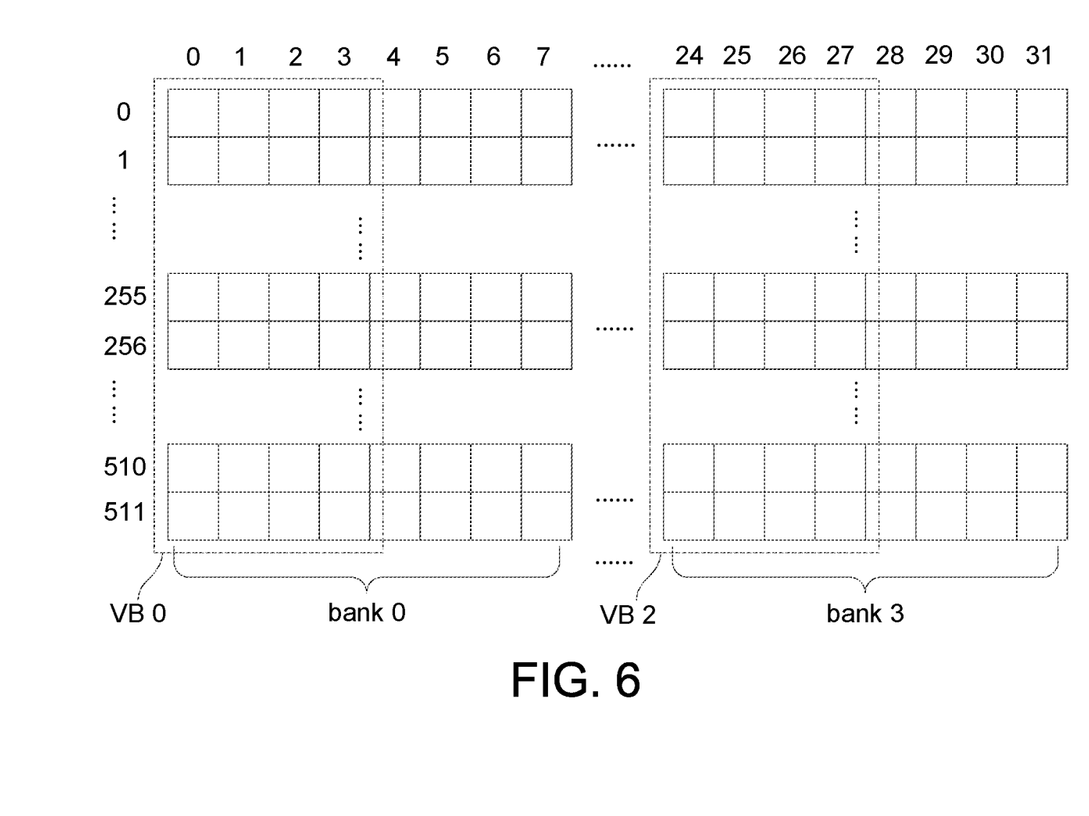
FIG. 6 is a first application schematic diagram of a virtual memory management method according to an embodiment of the present application.

Referring to FIG. 6, FIG. 6 shows a first application schematic diagram of a virtual memory management method provided according to an embodiment of the present application.

In an application example, the physical memory includes multiple banks b0 to b3, wherein bank 0 includes storage units U0 to U7, and bank 3 includes storage units U24 to U31. U0 to U3 may form virtual memory V0, and U 24 to U 27 may form virtual memory VB2.

It should be noted that, for one virtual memory determined for m storage units, the m storage units may be divided into n storage groups using different grouping approaches, such that the n address mapping relationships obtained at the end may also be different. The n address mapping relationships obtained by different grouping approaches may be used to access the same virtual memory.

Figure 7:
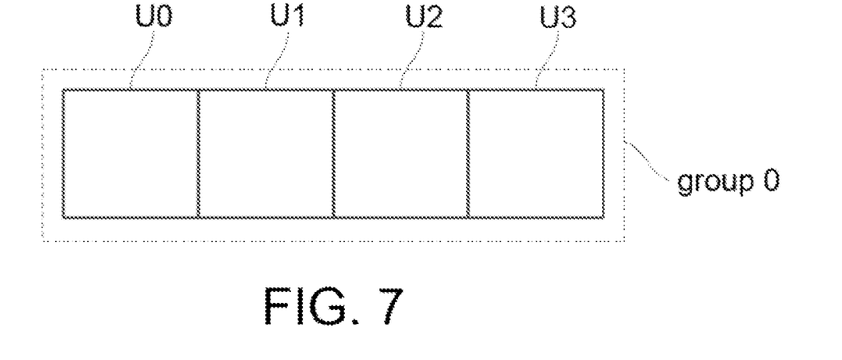
FIG. 7 is a second application schematic diagram of a virtual memory management method according to an embodiment of the present application.
Figure 8:
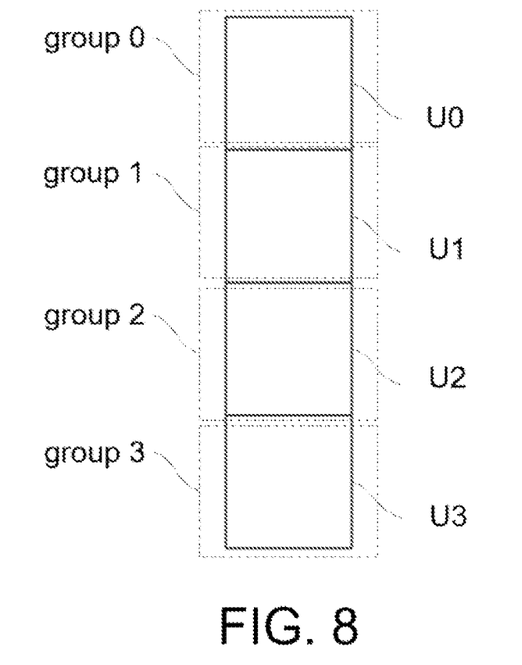
FIG. 8 is a third application schematic diagram of a virtual memory management method according to an embodiment of the present application.

Referring to FIG. 7 and FIG. 8, FIG. 7 shows a second application schematic diagram of a virtual memory management method provided according to an embodiment of the present application, and FIG. 8 shows a third application schematic diagram of a virtual memory management method provided according to an embodiment of the present application.

As shown in FIG. 7, for virtual memory VB0 formed by U0 to U3, U0, U1, U2 and U3 may be divided into one storage group, e.g., divided into group 0. Then, the address mapping relationship of group 0 is determined, and the one address mapping relationship obtained may be used to access virtual memory VB0.

As shown in FIG. 8, for virtual memory VB0 formed by U0 to U3, U0, U1, U2 and U3 may be divided into four storage groups, for example, U0 is divided into group 0, U1 is divided into group 1, U2 is divided into group 2 and U3 is divided into group 3. Then, the address mapping relationships of group 0, group 1, group 2 and group 3 are determined, and the four address mapping relationships obtained may be used to access virtual memory VB0.

Figure 9:
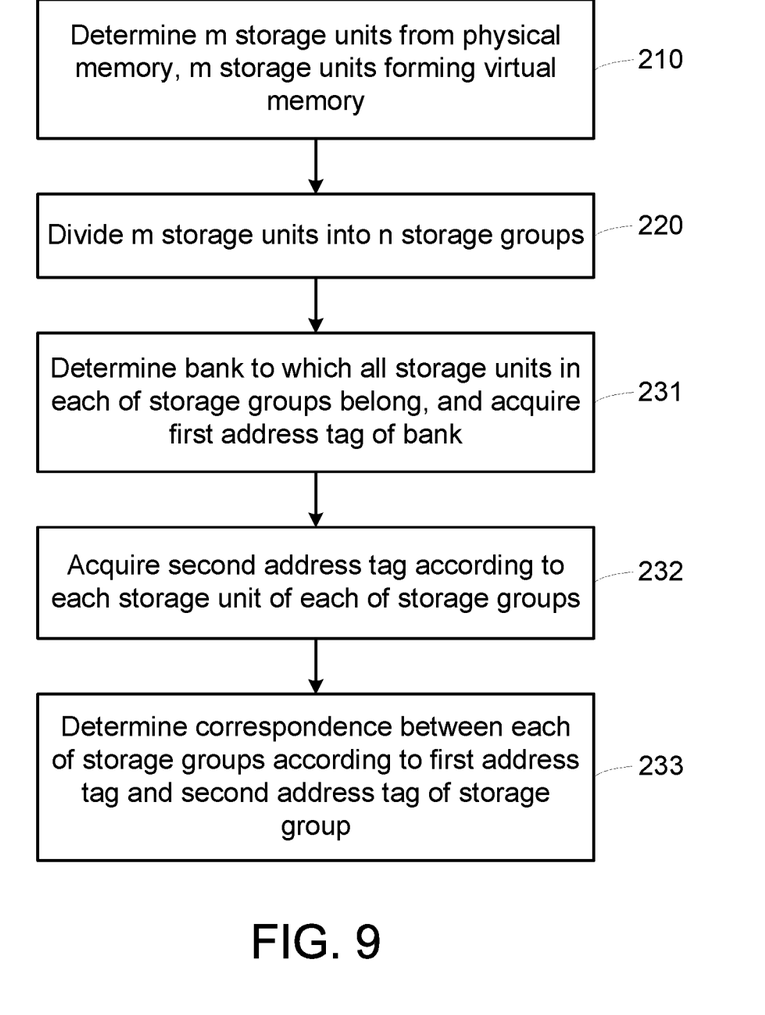
FIG. 9 is a second flowchart of a virtual memory management method according to an embodiment of the present application.

Referring to FIG. 9, FIG. 9 shows a second flowchart of a virtual memory management method provided according to an embodiment of the present application. Compared to the first flowchart in FIG. 5, step 230 in FIG. 5 is further divided into steps 231 to 233 in the second flowchart, with associated details given as below.

In step 231, a bank to which all storage units in each storage group is determined, and a first address tag of the bank is acquired.

After dividing the m storage units into n storage groups, the CPU 12 may further sequentially determine the bank to which all the storage units in each storage group belong, and acquire a first address tag of the bank. The first address tag is a tag for distinguishing the bank from other banks, and is, for example, the serial number of the bank.

In step 232, a second address tag is acquired according to each storage unit in each of the storage groups. The CPU 12 acquires a second address tag according to each storage unit in each of the storage groups. The second address tag may be used to distinguish the storage unit from other storage units in the bank, and is, for example, the serial number of the storage unit.

In step 233, the address mapping relationship of each of the storage groups is determined according to the first address tag and the second address tag of the storage group.

For example, the m storage units determined by the CPU 12 includes four storage units U0, U1, U2 and U3, and the four storage units are divided into group 0. Then, the CPU 12 determines the bank to which U0, U1, U2 and U3 in group 0 belong; for example, it is determined that U0, U1, U2 and U3 belong to bank 0. Next, a first address tag of bank 0 is acquired, for example, the bank serial number of bank 0. The first address tag may be represented as bank mark, and allows bank 0 to be distinguished from other banks in the physical memory 13, so that bank 0 can be determined from multiple banks of the physical memory 13 according to the first address tag.

The CPU acquires a second address tag according to U0, U1, U2 and U3 in group 0, for example, acquiring a storage unit serial number. The second address tag may be represented as U mark, and allows U0, U1, U2 and U3 to be distinguished from other storage units in bank 0, so that U0, U1, U2 and U3 can be determined from bank 0.

Lastly, the CPU 12 can determine the address mapping relationship of group 0 according to the first address tag of bank 0 and the second address tag of U0, U1, U2 and U3.

In another embodiment, the m storage units determined by the CPU 12 includes four storage units U0, U1, U2 and U3, and the four storage units are divided into four storage groups group 0, group 1, group 2 and group 3. Then, the CPU 12 sequentially determines the bank to which U0 in group 0 belongs, the bank to which U1 in group 1 belongs, the bank to which U2 in group 2 belongs and the bank to which U3 in group 3 belongs; for example, it is determined that U0 belongs to bank 0, U1 belongs to bank 0, U2 belongs to bank 0 and U3 belongs to bank 0. Next, the first address tag of bank 0 and the second address tag of U0 in group 0, the first address tag of bank 0 in group 1 and the second address tag of U1 in group 1, the first address tag of bank 0 and the second address tag of U2 in group 2, and the first address tag of bank 0 and the second address tag of U3 in group 3 are sequentially acquired.

Lastly, the CPU 12 can determine the address mapping relationship of group 0 according to the first address tag and the second address tag corresponding to group 0, the address mapping relationship of group 1 according to the first address tag and the second address tag corresponding to group 1, the address mapping relationship of group 2 according to the first address tag and the second address tag corresponding to group 2, and the address mapping relationship of group 3 according to the first address tag and the second address tag corresponding to group 3.

In one embodiment, since each bank of the physical memory 13 has a serial number for distinguishing from other banks, the bank serial number of the bank can be acquired when the first address tag of the bank is acquired and be used as the first address tag of the bank. For example, for bank 0, the bank serial number 0 can be used as the first address tag.

It should be noted that, because computers store data in a binary manner, format conversion may be performed on the bank serial number acquired. For example, a 4-bit binary value may be used to represent the bank serial number, and a predetermined character, e.g., 4b', may be added before the 4-bit binary value. For example, the bank serial number 0 after conversion may be represented as 4'b0001, and the bank serial number 2 after conversion may be represented as 4'b0100.

Similarly, format conversion may also be performed on the storage unit serial number when the second address tag is determined. For example, an 8-bit binary value may be used to represent the second address tag, and a predetermined character, e.g., 8'b, is added before the 8-bit binary value. For example, the storage unit serial number 0 after conversion may be represented as 8'b00000001, and the storage unit serial numbers 0, 1, 2 and 3 after conversion may be represented as 8'b00001111.

It is understandable that, when determining the address mapping relationship of each of storage groups according to the first address tag and the second address tag of the storage group, the CPU 12 may determine the address mapping relationship of the storage group according to the format converted first address tag and second address tag. For example, when the first address tag is 4'b0001 and the second address tag is 8'b00001111, it can be determined that the address mapping relationship of the storage group includes information 12'b000100000001. When the first address tag is 4'b0100 and the second address tag is 8'b00001111, it can be determined that the address mapping relationship includes information 12'b010000001111.

Figure 10:
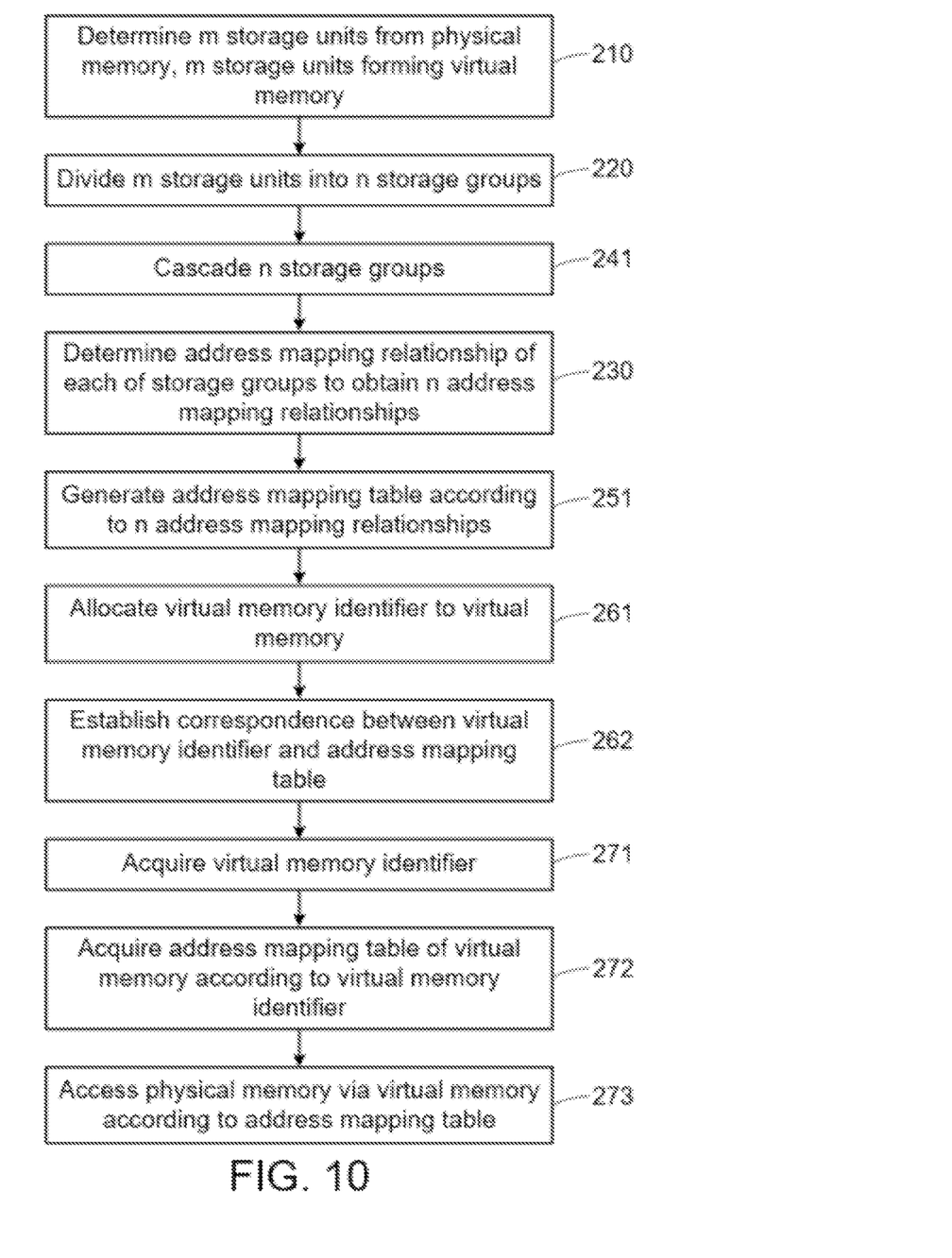
FIG. 10 is a third flowchart of a virtual memory management method according to an embodiment of the present application.

In some embodiments, referring to FIG. 10, FIG. 10 shows a third flowchart of a virtual memory management method provided according to an embodiment of the present application. In the third flowchart, when n is greater than 1, the virtual memory management method further includes, after dividing the m storage units into n storage groups, the following steps.

In step 241, then storage groups are cascaded.

When the n storage groups obtained from dividing are multiple storage groups, that is, when n is greater than 1, for example, when four storage groups U0, U1, U2 and U3 are divided into group 0, group 1, group 2 and group 3, the four groups group 0, group 1, group 2 and group 3 may be cascaded, so as to increase the depth of data storage of the virtual memory and the depth of data access of the electronic apparatus. The feature "cascade" may be understood as adding up the depths of multiple cascaded storage groups.

For example, assuming that the depths of group 0, group 1, group 2 and group 3 are all 512 bits, the depth of the virtual memory obtained after cascading group 0, group 1, group 2 and group 3 is 2048 bits, thereby increasing the depth.

Referring to FIG. 10, in one embodiment, after n address mapping relationships are obtained by determining the address mapping relationship of each of the storage groups, the virtual memory management method further includes the following steps.

In step 251, an address mapping table is generated according to the n address mapping relationships, wherein the address mapping table may include correspondence between n virtual addresses of the virtual memory and physical addresses of the m storage units.

It should be noted that, for the same virtual memory, the address mapping table obtained may be different according to different grouping approaches of the storage groups; that is, one virtual memory may correspond to multiple address mapping tables. Different address mapping tables may be accessed by different engines.

For example, assume that engine 1 can only access a storage space having a 152-bit width, and engine 2 can only access a storage space having a 256-bit width. If engine 1 and engine 2 are to access the same virtual memory, two different address mapping tables corresponding to the same virtual memory may be generated, wherein one of the address mapping tables uses four Us arranged side by side so that the data access width is 512 bits, and the other uses 2 Us arranged side by side so that the data access width is 256 bits.

In step 261, a virtual memory identifier is allocated to the virtual memory. After the CPU 12 generates the address mapping table, a virtual memory identifier may be allocated to the virtual memory, wherein the virtual memory identifier is for distinguishing from other virtual memories. For example, the virtual memory identifier may be a virtual memory identifier, e.g., VB0 or VB3.

In step 262, correspondence between the virtual memory identifier and the address mapping table is established. Specifically, the CPU 12 establishes correspondence between the virtual memory identifier and the address mapping table, so that the corresponding mapping table can be obtained according to the virtual memory identifier, and the corresponding virtual memory can be accessed according to the address mapping table.

In step 271, the virtual memory identifier is acquired.

In step 272, the address mapping table of the virtual memory is acquired according to the virtual memory identifier.

In step 273, the physical memory is accessed via the virtual memory according to the address mapping table.

After the electronic apparatus 100 has established correspondence between the virtual memory identifier and the address mapping table, an access function to the virtual memory can be provided. To access the virtual memory, for example, when an engine in the electronic apparatus 100 accesses the virtual memory, the virtual memory identifier is first acquired, the address mapping table of the virtual memory is acquired according to the virtual memory identifier, and the physical memory is then accessed via the virtual memory according to the address mapping table.

For example, the virtual memory identifier VB0 is first acquired, and then the address mapping table corresponding to VB0 is acquired, so that the engine can access data stored in individual storage units of the physical memory corresponding to the virtual memory according to the address mapping table.

It is known from the above, in the virtual memory management method provided according to the embodiments of the present application, the number of storage units in each storage group can be configured according to requirements of an operation accelerator in the IPU 11 by means of dividing the m storage units into n storage groups, and the data storage bit width and the data storage depth of the virtual memory are dynamically updated to thereby improve data storage and access efficiency.

The virtual memory management method and the processor provided according to the embodiments of the present application are as described in detail above. The principle and implementation details of the present application are described by way of specific examples in the literature, and the illustrations given in the embodiments provide assistance to better understand the method and core concepts of the present application. Variations may be made to specific embodiments and application scopes by a person skilled in the art according to the concept of the present application. In conclusion, the disclosure of the detailed description is not to be construed as limitations to the present application.

What is claimed is:

1. A virtual memory management method, applied to an intelligent processor, the intelligent processor comprising an operation accelerator, the virtual memory management method comprising:
   selecting m storage units from a physical memory, the m storage units forming a virtual memory, each of the storage units having a predetermined data width and a predetermined data depth;
   dividing the m storage units into n storage groups; and
   determining an address mapping relationship of each of the storage groups to obtain n address mapping relationships, the n address mapping relationships being correspondence between n virtual memory addresses of the virtual memory and physical addresses of the m storage units;
   wherein, m and n are positive integers, m is greater than or equal to n, and m and n are dynamically updated according to requirements of the operation accelerator, and
   wherein each of the n virtual memory addresses corresponds to one of the n storage groups.

2. The virtual memory management method according to claim 1, wherein the physical memory comprises a plurality of banks, each of the banks comprises the plurality of storage units, and the determining the address mapping relationship of each of the storage groups comprises:
   determining a bank to which all storage units in each of the storage groups belong, and acquiring a first address tag of the bank;
   acquiring a second address tag according to each storage unit in each of the storage groups; and
   determining the address mapping relationship of each of the storage groups according to the first address tag and the second address tag of the storage group.

3. The virtual memory management method according to claim 2, wherein the acquiring the first address tag of the bank comprises:
   acquiring a bank serial number of the bank; and
   using the bank serial number as the first address tag of the bank.

4. The virtual memory management method according to claim 2, wherein acquiring the second address tag according to each storage unit in each of the storage groups comprises:
   acquiring a storage unit serial number of each storage unit in each of the storage groups; and
   determining the second address tag of the each of the storage groups according to the storage unit serial numbers of the plurality of storage units in the storage group.

5. The virtual memory management method according to claim 1, further comprising:
   cascading the n storage groups.

6. The virtual memory management method according to claim 1, further comprising:
   generating an address mapping table according to the n address mapping relationships.

7. The virtual memory management method according to claim 6, further comprising:
   allocating a virtual memory identifier to the virtual memory; and
   establishing correspondence between the virtual memory identifier and the address mapping table.

8. The virtual memory management method according to claim 7, further comprising:
   acquiring the virtual memory identifier;
   acquiring the address mapping table of the virtual memory according to the virtual memory identifier; and
   accessing the physical memory according to the address mapping table.

9. A processor, configured to execute a program code to implement a virtual memory management method, the virtual memory management method being applied to an intelligent processor, the intelligent processor comprising an operation accelerator, the virtual memory management method comprising:
   selecting m storage units from a physical memory, the m storage units forming a virtual memory, each of the storage units having a predetermined data width and a predetermined data depth;

dividing the m storage units into n storage groups; and determining an address mapping relationship of each of the storage groups to obtain n address mapping relationships, the n address mapping relationships being correspondence between n virtual memory addresses of the virtual memory and physical addresses of the m storage units;

wherein, m and n are positive integers, m is greater than or equal to n, and m and n are dynamically updated according to requirements of the operation accelerator, and wherein each of the n virtual memory addresses corresponds to one of the n storage groups.

10. A virtual memory management method, applied to an intelligent processor, the intelligent processor comprising a first operation accelerator and a second operation accelerator, the virtual memory management method comprising:

selecting m storage units from a physical memory, the m storage units forming a first virtual memory, each of the storage units having a predetermined data width and a predetermined data depth;

dividing the m storage units into n storage groups;

determining a first address mapping table corresponding to the first virtual memory, the first address mapping table comprising correspondence between n virtual addresses of the first virtual memory and physical addresses of the m storage units;

selecting i storage units from the physical memory, the i storage units forming a second virtual memory;

dividing the i storage units into j storage groups; and determining a second address mapping table corresponding to the second virtual memory, the second address mapping table comprising correspondence between j virtual addresses of the second virtual memory and physical addresses of the i storage units;

wherein, the first virtual memory is for storing data of the first operation accelerator, the second virtual memory is for storing data of the second operation accelerator, m, n, i, and j are positive integers, m is greater than or equal to n, i is greater than or equal to j, and m is not equal to i, and wherein each of the n virtual addresses corresponds to one of then storage groups.

11. The virtual memory management method according to claim 10, further comprising:

allocating a first virtual memory identifier to the first virtual memory; and establishing correspondence between the first virtual memory identifier and the first address mapping table.

12. The virtual memory management method according to claim 11, further comprising:

acquiring the first virtual memory identifier;

acquiring the first address mapping table corresponding to the first virtual memory according to the first virtual memory identifier; and accessing the physical memory according to the first address mapping table.

* * * * *